United States Patent [19]

Corby, Jr. et al.

[11] Patent Number: 5,515,301

[45] Date of Patent: May 7, 1996

[54] REAL-TIME VISUALIZATION SYSTEM FOR MULTIPLE TIME-SAMPLED SIGNALS

[75] Inventors: Nelson R. Corby, Jr., Scotia; Christopher A. Nafis, Vischer Ferry; Paul D. Miller, Altamont, all of N.Y.

[73] Assignee: General Electric Company, Schenectady, N.Y.

[21] Appl. No.: 267,622

[22] Filed: Jun. 29, 1994

[51] Int. Cl.$^6$ .............................. G06T 17/40; G09G 5/14
[52] U.S. Cl. .......................... 364/578; 382/154; 382/201; 395/119
[58] Field of Search ...................... 364/578, 474.05, 364/474.24, 474.37, 550, 551.01, 551.02; 382/8, 1; 434/43; 340/728; 356/375, 376; 128/644; 244/1 R; 395/119, 120

[56] References Cited

U.S. PATENT DOCUMENTS

| | | | |
|---|---|---|---|
| 4,589,140 | 5/1986 | Bishop et al. | 382/8 |
| 4,645,459 | 2/1987 | Graf et al. | 434/43 |
| 4,835,532 | 5/1989 | Fant | 340/728 |
| 4,965,840 | 10/1990 | Subbarao | 382/1 |
| 5,027,281 | 6/1991 | Rekow et al. | 364/474.24 |
| 5,198,877 | 3/1993 | Schulz | 356/375 |
| 5,291,888 | 3/1994 | Tucker | 128/644 |
| 5,319,445 | 6/1994 | Fitts | 356/376 |
| 5,335,317 | 8/1994 | Yamashita et al. | 395/119 |
| 5,390,292 | 2/1995 | Takamura et al. | 395/120 |
| 5,398,885 | 3/1995 | Andersson et al. | 244/1 R |
| 5,422,820 | 6/1995 | Seki et al. | 364/474.24 |
| 5,432,703 | 7/1995 | Clynch et al. | 364/474.05 |
| 5,452,219 | 9/1995 | Dehoff et al. | 364/474.05 |

*Primary Examiner*—Kevin J. Teska
*Assistant Examiner*—Russell W. Frejd
*Attorney, Agent, or Firm*—Lawrence P. Zale; Marvin Snyder

[57] ABSTRACT

A 3D model of a subject is acquired. Sensors spatially located on the subject are displayed on the 3D model in their appropriate locations. An operator selects the proper viewing angle and sensors to monitor via input devices. A 3D modeler in a display processor provides an image viewed from the proper angle and identifies the selected sensors. The 3D modeler identifies the data channels which correspond to the selected sensors and provides these to a system control computer which then provides the samples for these data channels. The 3D modeler also identifies a screen location which pertains to the locations of the selected sensors on the model. A postage stamp trace unit receives the samples for the selected data channels and the screen locations pertaining to the selected sensor locations of the image of the model and produces a video signal representing a window having a number of real-time traces each pertaining to a sensor. The real-time traces are located at a screen location corresponding to the location of the sensor on the model. The video signal is provided to a video mixer, along with a high resolution window of the same traces. This allows the operator to simultaneously view the relative spatial location of the sensor signals, as well as the sensor signals. Another window also provides the status of processors in the system.

4 Claims, 3 Drawing Sheets

REAL-TIME VISUALIZATION SYSTEM FOR MULTIPLE TIME-SAMPLED SIGNALS

CROSS REFERENCE TO RELATED APPLICATIONS

This invention is related to U.S. patent application Ser. Nos. 08/267,623 filed Jun. 29, 1994) "Real-Time Acquistion and Archiving System for Multiple Time Sample Signals" By N. Corby, R. Hogle; and (Ser. No. 08/268,393 filed Jun. 29, 1994) "Real-Time Processing of Packetized Time-sample Signals Employing a Systolic Array" by N. Corby, P. Miller; both assigned to the present assignee and hereby incorporated by reference.

BACKGROUND OF INVENTION

1. Field of the Invention

The present invention relates to a system for acquiring, displaying and archiving digital time sampled signals, and more particularly, for a system which acquires, displays and archives data from a large number of sensors.

2. Description of Related Art

There exist many systems which consist of arrays of transducers, or sensors, which are arranged in a complex spatial arrangement and for which digitized representations of the signals has to be acquired, monitored and ultimately archived for later use. Acquisition is the process of moving the sampled, digitized data from a sensor onto some type of temporary storage device. Monitoring is the process of viewing a representation of the data and possibly verifying that the data is of good quality. Archiving is the process of storing the acquired data onto a permanent (usually removeable) medium like magnetic disk or tape or optical disks.

Common examples of such systems include vibration testing systems having arrays of accelerometers, temperature mapping systems having arrays of thermocouples and medical instruments such as electrocardiographic body surface potential measurement system. Another medical system is a magnetic source imaging system which uses a complex arrangement of hundreds of superconducting coils arranged over the chest of patient, known as magnetocardiography, or over the head of a patient known as magnetoencephalography. In these systems, it is necessary to perform the three functions of acquisition, monitoring and archiving.

Typically each sensor produces an analog, time-varying signal. These are usually digitized and stored on an archive device. Since there are many sensors in these systems, data rates for acquisition in real-time exceed the data rate of archive devices. The use of faster archive devices becomes increasingly more expensive, and a limiting factor for real-time archiving.

When hundreds, or thousands, of sensors are involved, it becomes very difficult to select or to jointly view the signal from selected sensors. Usually some method is provided to choose signals for display by, for example, entering channel numbers, each related to a specific sensor, or a group of sensors. Typically, a few dozen waveforms are arranged one above the other. These may be viewed on a stripchart or stripchart-like device. These devices produce waveforms on paper that create a plot of a given signal value versus time. The paper continuously runs through the recorder showing the signals as they vary over time. Typically, the individual traces are assigned differing colors.

Another device which may be used to display the selected signals is a cathode ray tube (CRT) display. On a CRT display, the usual solution involves a scrolling-type display, in which the waveforms appear to enter from one side of the display window, slide sideways through the window at a constant rate and then disappear out the side opposite to which they entered.

This fixed arrangement of traces on the stripchart or CRT display does not allow the viewer or operator of the system to appreciate the inter-relation of signals caused by the physical placement of sensors. In order to understand, or further process the acquired data, one must appreciate the relative positioning of the sensors which are producing the signals being monitored.

Another problem involves interaction between the system operator and the viewing/acquisition system. Typically, the operator must be able to move around the piece of equipment under test or around the patient in a medical system. With standard operator input devices, the operator has to continually return to the display console to adjust the system parameters or the display parameters.

Thus, there is a need to acquire data, temporarily store the acquired data, display the data and archive the data in such a way that the acquisition of new data is not impeded.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

SUMMARY OF THE INVENTION

Figure 1:
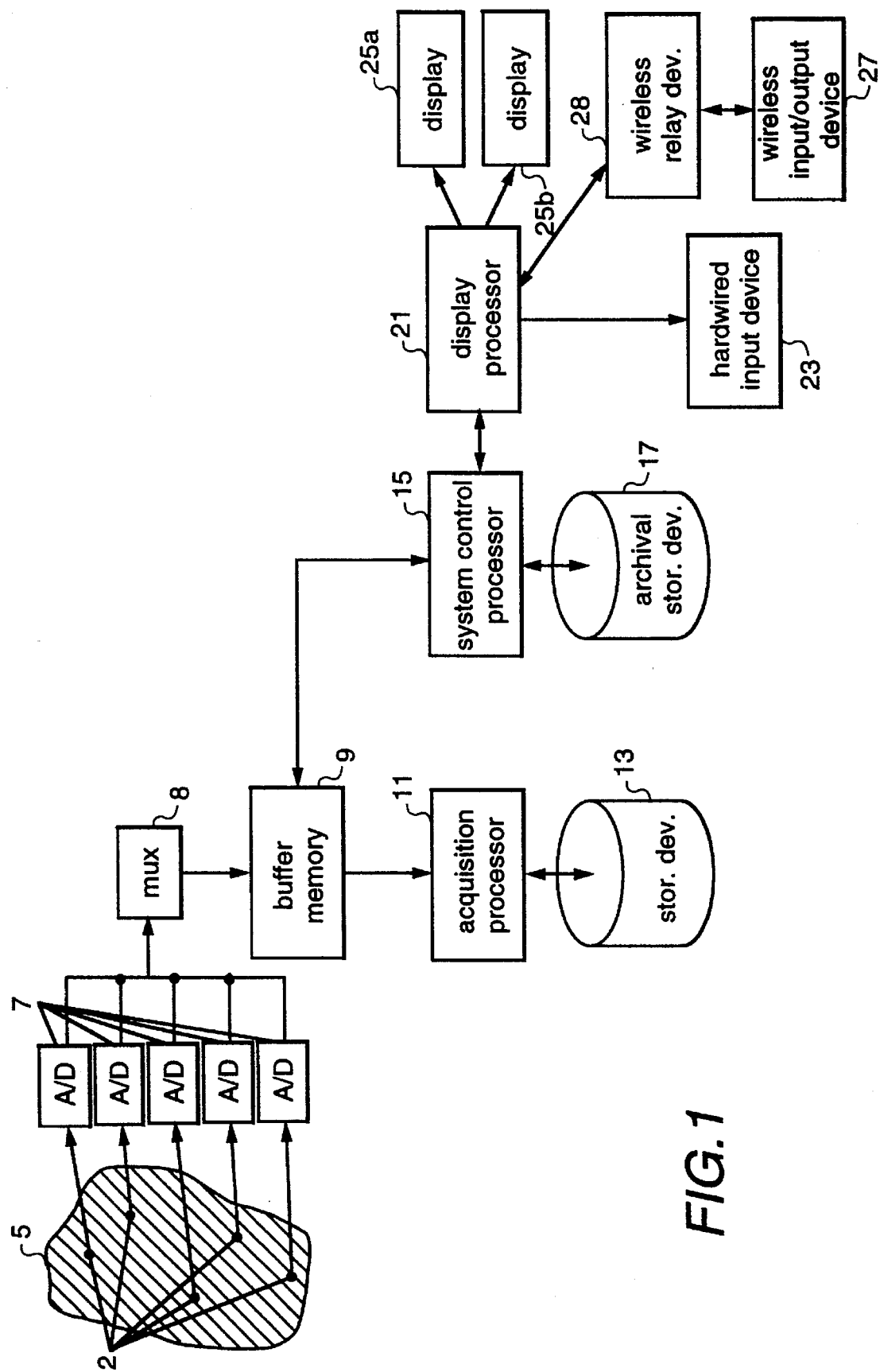
FIG. 1 is a diagram of a system for acquiring and monitoring time-sampled signals from an array of transducers.

According to the present invention, a system for the acquisition and monitoring of time sampled signals from a spatial arrangement of sensors includes a buffer memory to temporarily buffer incoming data samples, a dedicated acquisition processor having access to the temporary buffer memory coupled to storage device, a system control processor coupled to an archive storage device to coordinate the actions of the dedicated acquisition processors, a display processor with hardwired and non-hardwired remote operator input devices and one or more CRT display devices.

Data flowing in from a sensor array is temporarily buffered by the buffer memory.

The system control processor routes selected data samples from the buffer memory to the display processor which creates sequences of image data which are viewed on one or more displays attached to the display processor. Hardwired input devices and wireless input devices attached to the display processor allow the operator to interact with the display processor and to affect the actions of the system control processor.

The display may be one CRT screen subdivided into a number of independent "windows" or may consist of a number of CRTs each containing one or more windows. One window is the sensor selector window. This window contains a schematic image (such as a "wireframe") derived from the actual 3-D arrangement of sensors. The schematic image may be two or three dimensional. The selection window may contain a spatially registered image showing the actual shape of the subject being sensed. Means are provided to rotate and translate the sensor selector image to allow viewing the locations of all sensors. Means are provided to select a subset of the sensors for display directly from the contents of the sensor selector window. The sensors selected in the selection window determines the waveforms displayed in the spatially registered postage stamp.

The spatially registered postage stamp consists of a number of small scrolling windows (each of which contains one time-varying waveform) arranged so as to convey the spatial arrangement of the actual sensors. The selection and spatial arrangement of the scrolling windows will continuously vary as the selector image in the selector window is rotated or as the group of selected sensors are changed.

A third window of the display is the high resolution window. This window shows a limited number of waveforms drawn at high resolution in a scrolling format. The characteristics of this window are programmable and rapidly varied to suit the needs of a particular observer. The high resolution scrolling window contents are selected using operator input devices and the selector display window.

A fourth window of the display is the rotating status indicator window. This window constantly indicates the status of all processors in the system so that the operator may be assured of the correct operation of the system. The status window uses an array of color coded two dimensional shapes with time varying colors to convey status information.

DETAILED DESCRIPTION OF THE INVENTION

In FIG. 1, a plurality of sensors 2 monitor a subject 5. Sensors 2 are sampled by analog-to-digital (A/D) converters 7. Digital samples from A/D converter 7 are arranged into a packet of information by a multiplexer ("mux") 8 and temporarily stored in a buffer memory 9 which is preferably a first in first out (FIFO) memory. An acquisition processors 11 is responsive to a system control processor 15. Upon activation, acquisition processor 11 remove data packets from buffer memory and store them on a storage device 13.

A display processor 21 is coupled to system control processor 15, a set of hardwired operator input devices 23, one or more cathode ray tube-type (CRT) displays and a wireless, non-hardwired operator input/output device 27, which may be referred to as a remote control device.

Display processor 21 accepts operator input commands via the hardwired and remote control devices 23 and 27, respectively, and creates the sequence of images that are displayed on display(s) 25a, 25b attached to the display processor. System control processor 15 controls the low level details of the actual acquisition process, such as monitoring the buffer memory for the arrival or accumulation of dam, assigning specific acquisition processors for temporary storage of incoming data, sequencing data flow from the acquisition processor storage devices to the archive storage unit and also selects and routes data from buffer memory 9 to the display processor 21 for display.

Hardwired input devices 23 such as a mouse, keyboard, light pen and touch screen attached to display processor 21 allow the operator to interact with display processor 21 and to affect the actions of system control processor 15. The display processor has a wireless relay device 28 attached to it that receives coded transmissions from a hand-held remote control 27 carried by the operator. This remote control may have buttons for control, keys data input, and a display screen. Wireless relay device 28 may also provide a display signal to remote control 27 allowing the operator to monitor functions remotely on the display screen.

Figure 2:
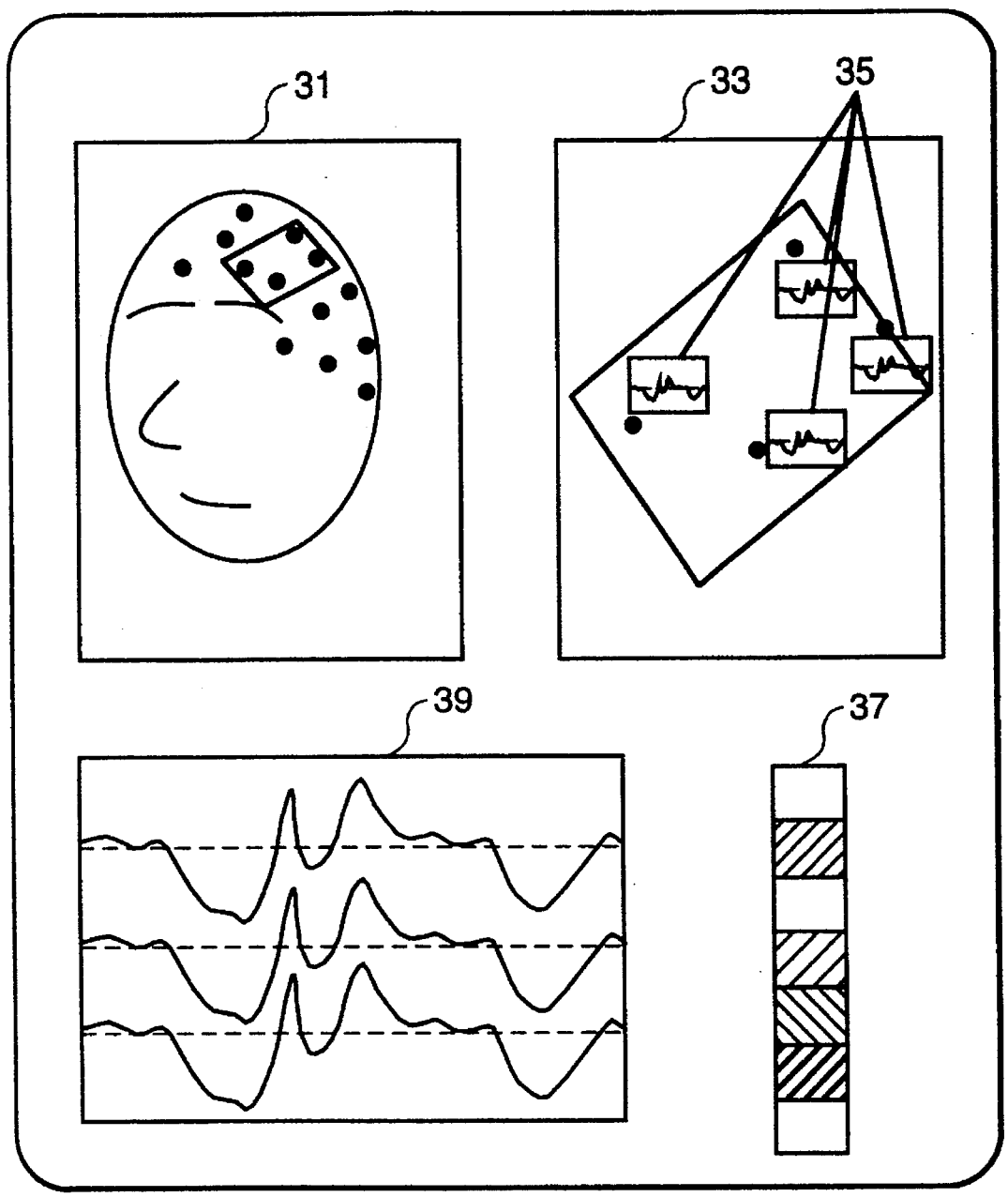
FIG. 2 is an illustration of a display according to the present invention showing sub-displays useful in selecting and monitoring time varying waveforms.

In FIG. 2, display 25 consists of one or more CRT displays, each of which are capable of displaying time-varying imagery in color. The image sequences are created by display processor 21. The following description applies to the case of one physical display, the display screen being divided into a number of sections, each of which can be independently altered. Alternatively, one or more window may be displayed on a physically separate CRT.

One window is a sensor selector window 31. This is typically a two dimensional image derived from the actual 3-D arrangement of sensors as viewed from a selected viewpoint. The two dimensional image is the result of a 3-D to 2-D projection operation. In addition, this window may show a rendered image of the surface of the subject under test or the relevant anatomy of a patient being examined. Sensor selector window 31 can also be a true 3-D display. Means are provided to rotate and translate image in sensor selector window 31 to allow viewing the locations of all sensors. Using hardwired or remote controlled operator input devices 23 and 27, respectively, the operator may select a subset of the sensor waveforms for display in a spatially registered postage stamp window 33. The operator may also use the input devices to cause the selected waveforms to move relative to each other as the subject being tested is rotated in sensor select window 31.

The waveforms from the selected sensors are displayed as small scrolling windows 35 arranged so as to convey the spatial arrangement of the actual sensors. These small scrolling windows are drawn in sensor spatially registered postage stamp 33. The selection and spatial arrangement will continuously vary as the image in selector window 31 is rotated or as the group of selected sensors are changed.

A third window of the display, a high resolution scrolling is window 39, displays a limited number of selected waveforms at high resolution in a scrolling format. The nature of the high resolution scrolling window is programmable and is designed to closely mimic standard output devices such as a paper strip chart recorder. High resolution scrolling window 39 contents are selected using operator input devices 23 and 27 and the selector display window 31.

Another window is a rotating status indicator 37. The graphic image in this window, typically a horizontal sequence of contiguous rectangles or a circle divided into equal wedge-shaped segments monitors the status of all processors in the system. Queries are sent by system control processor 15 to all processors in the system to determine their current status. Based on the reply from the each processor, the display processor changes the color of the segment of the status indicator according to a preselected color code for example: green= on line and active, yellow= on-line but busy, red=off-line. The status indicator display is updated periodically typically once every few seconds.

Figure 3:
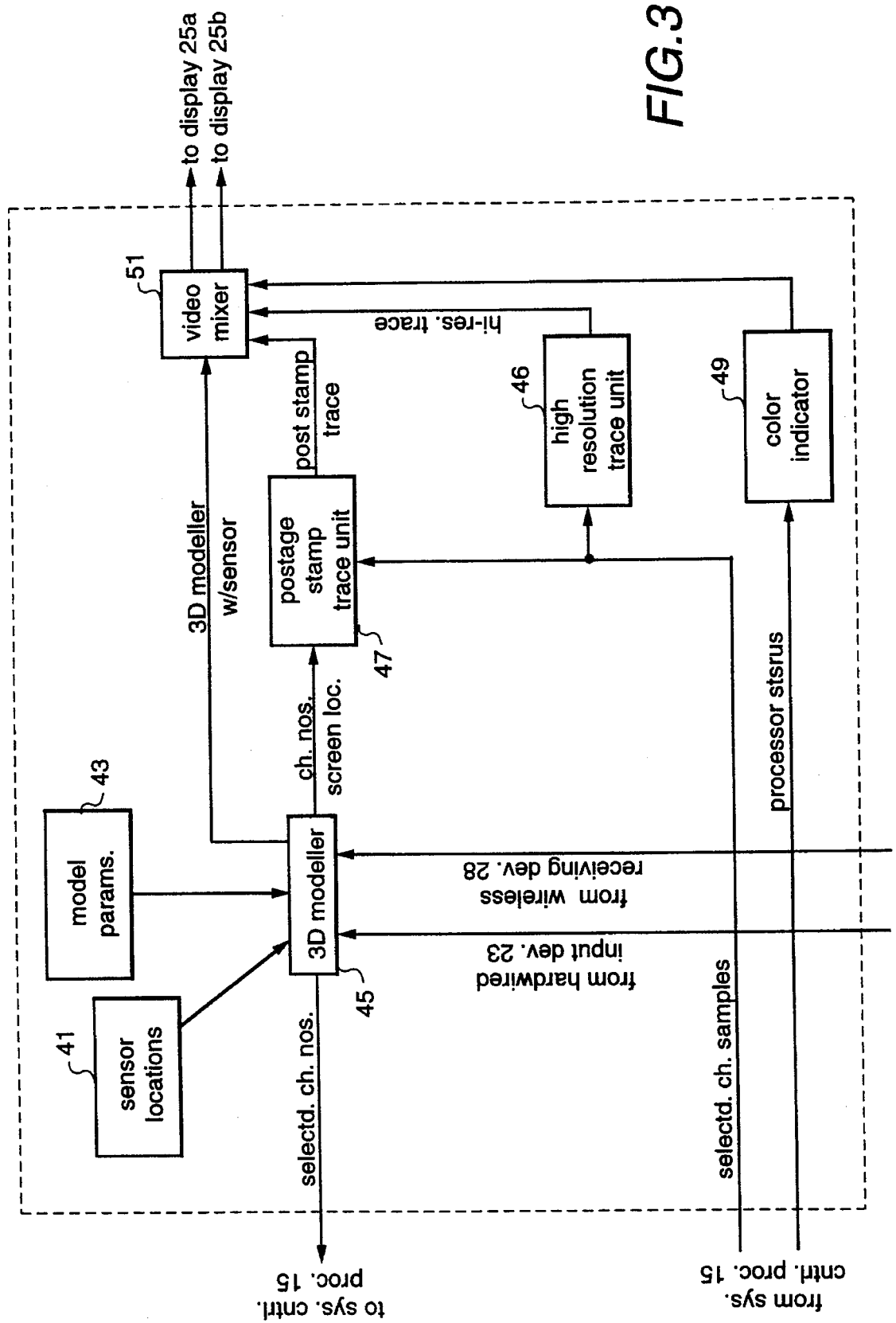
FIG. 3 is a more detailed block diagram of the display processor of FIG. 1.

FIG. 3 is a more detailed block diagram of display processor 21 of FIG. 1. Parameters defining the subject 5 being monitored are provided to a three-dimensional (3D)

modeler 45. These may be prestored in a memory 43. The location of the sensors 2 is also provided to 3D modeler. Again, these may be prestored in a memory 41. 3D modeler creates a three dimensional model of subject 5 and sensors 2, and an image of the model may be passed to a video mixer 51 to produce a window 31 of FIG. 2 on one or more of displays 25*a*, 25*b*.

An operator may then view window 31, rotate the model and select sensors to monitor, either by hardwired input device 23 or wireless input/output device 27. Wireless input/output device 27 communicates with a wireless relay device 28 which relays information to and from 3D modeler 45. 3D modeler 45 determines the channel number for each selected sensor, and the current screen position of the selected sensor.

The channel numbers are provided to system control computer 15, which isolates these channels and passes a signal from these channels to a postage stamp trace unit 47, and a high resolution trace unit 46. Postage stamp trace unit 47 is also connected to 3D modeler 45, and receives a screen location corresponding to each selected sensor and its associated data channel number. Postage stamp trace unit then creates a video signal representing spatially registered postage stamp window 33 of FIG. 2. Window 33 is a plurality of real-time postage stamp traces of its corresponding sensor output signal, positioned at a screen location corresponding to the sensor's screen location as represented in sensor selector window 31, thereby relating the trace with its location on subject 5.

High resolution trace unit 46 receives at least one data channel signal and produces a high resolution signal representing a real-time trace of all data channels it receives displayed simultaneously. This signal is provided to video mixer 51 which produces a high resolution window 39 of FIG. 2.

Status indications are provided to a color indicator 49, which equates a color to the status of each processor in the system. This is fed to video mixer 51 to produce window 37 indicating the status of the system.

Video mixer 51, receives the video signals from 3D modeler 45, postage stamp trace unit 47, high resolution trace unit 46 and color indicator 49, representing sensor selector window 31, spatially registered postage stamp window 33, high resolution window 39 and system status window 37, respectively, and displays one or more of the windows on one or more displays 25*a*, and 25*b*.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A display system for displaying sensor signals to an operator from a plurality of sensors spatially arranged on a subject keyed to the location of each sensor comprising:

a) a system control processor for receiving a sensor signal from each of the plurality of sensors and for providing only sensor signals for sensors selected by said operator;

b) input means for providing sensor locations;

c) means for providing model parameters defining a surface model of said subject;

d) display means for providing a visible image of video signals provided to it;

e) a three-dimensional (3D) modeler coupled to the system control processor, the input means for providing sensor locations, the means for providing model parameters, for receiving the subject model parameters and sensor locations, and for displaying a surface model of said subject and sensors on the display means, for interacting with said operator to select sensors to be monitored, for indicating the selected sensors on the surface model, for determining a screen location of the selected sensors, and for communicating which sensors where selected to the system control computer;

f) postage stamp trace unit coupled to the system control computer, the 3D modeler, and the display means for receiving the screen locations of the selected sensors from the 3D modeler, the signals of the selected sensors from the system control computer and for providing a display signal to the display means representing a window having a real-time trace for each selected sensor channel superimposed upon the model image, with each window located proximate to the screen location of the sensor providing that signal.

2. The display system for displaying sensor signals to an operator of claim 1 further comprising a color indicator coupled to the system control processor and the video mixer, for receiving status information of elements of the system and for providing a color-coded window indicating the status of each element to the video mixer.

3. The display system for displaying sensor signals to an operator of claim 1 further comprising a high resolution trace unit for receiving a signal from at least one data channel from the system control computer, and providing a high resolution window signal showing a real-time high resolution trace of all selected sensor signals simultaneously, and providing the high resolution signal to the video mixer to produce a high resolution window.

4. A method for displaying sensor signals to an operator from a plurality of sensors spatially arranged on a subject comprising:

a) acquiring 3D sensor locations;

b) acquiring surface model parameters defining surfaces of said subject;

c) creating a surface model from the surface model parameters indicating the sensor locations;

d) displaying the surface model with sensors to said operator;

e) interacting with said operator to select sensors to be monitored;

f) determining a screen location, as displayed on the model for each selected sensor;

g) acquiring a sensor signal created by each selected sensor;

h) displaying each sensor signal as a real-time trace superimposed upon the surface model at a location proximate to the selected sensor creating the signal.

* * * * *